United States Patent [19]

Larsen

[11] 4,294,196

[45] Oct. 13, 1981

[54] GATE ASSEMBLY

[76] Inventor: Owen M. Larsen, Box 68, Mitta Roadside, Tallangatta, Victoria 3700, Australia

[21] Appl. No.: 121,556

[22] Filed: Feb. 14, 1980

[30] Foreign Application Priority Data

Feb. 15, 1979 [AU] Australia ............................. PD7702

[51] Int. Cl.³ ............................................... A01K 1/00
[52] U.S. Cl. .......................................... 119/27; 49/385
[58] Field of Search .................. 119/27, 14.03; 49/385

[56] References Cited

U.S. PATENT DOCUMENTS 3,742,910 7/1973 Ridding ................................. 119/27

Primary Examiner—Hugh R. Chamblee
Attorney, Agent, or Firm—Fulbright & Jaworski

[57] ABSTRACT

A gate assembly for a milking parlor including a pivotal barrier mounted on a horizontal axis and operating levers to move gate between opened and closed positions, the levers include a bell crank providing an over center locking action.

5 Claims, 4 Drawing Figures

GATE ASSEMBLY

The present invention relates to an improved gate assembly for an animal enclosure and relates particularly, although not exclusively, to a gate assembly for controlling the exit of cattle from a milking parlour.

In a typical milking parlour an elongated central working area or pit is located between two relatively elevated parallel stalls each having an entry and exit gate at either end. The exit gates are arranged obliquely to the longitudinal direction of the stalls and this together with the narrowness of the stalls forces the cattle to adopt a milking position parallel to the gate. Normally the cattle in the two stalls have opposing oblique dispositions which is known as the "herringbone" arrangement.

Milking parlours of this type have always had problems associated with the control of cattle through the exit gates. Gates which swing about a vertical axis cannot successfully be utilised in view of the closeness of the formation of exiting cattle. If it is desired to prevent a particular cow from exiting, the gate cannot be closed until the cow has completely passed through the gate. As the following cow is very close to the rump of the exiting cow, the time delay between exit of the cow, and the closing of the gate, is sufficient to enable the following cow to be in a position preventing closure of the gate.

To overcome this problem gates are normally mounted on an upright of the enclosure adjacent the pit for pivotal movement about a horizontal axis. As the pivotal connection of the gate is opposite that of the heads of the cattle, the gate has a substantial distance to travel before the gate can act to prevent exit of cattle.

Accordingly it is an object of the present invention to alleviate the problems discussed above.

A further object of the present invention is to provide a gate which controls the exit of cattle and enables the gate to be positively closed when required.

In a preferred embodiment of the invention it is another object of the invention to enable actuation of the gate from a position remote from the gate.

Accordingly in one aspect of the present invention there may be provided a gate assembly for a milking parlour or like animal enclosure including a barrier adapted to be swung about a substantially horizontal elevated axis between an open position in which it allows exit of an animal from the enclosure, and a closed position in which it prevents such exit, operating means for said barrier and a lever arrangement connecting said operating means to the barrier providing locking means tending to hold the barrier open against the action of gravity.

In a further aspect there may also be provided a gate assembly for a milking parlour or like animal enclosure including a barrier adapted to be swung about a substantially horizontal elevated axis between an open position in which it allows exit of an animal from the enclosure, and a closed position in which it prevents such exit, said barrier having a lateral extension from the side which is lower when the barrier is open, said extension being so positioned as, in use, to ride over the side flank of an exiting animal and to subsequently prevent the exit of the following animal and to prevent the barrier from catching on the exiting animals hips.

Practical embodiments of the invention will now be described with reference to the non-limitative examples illustrated in the accompanying drawings, in which.

Figure 1:
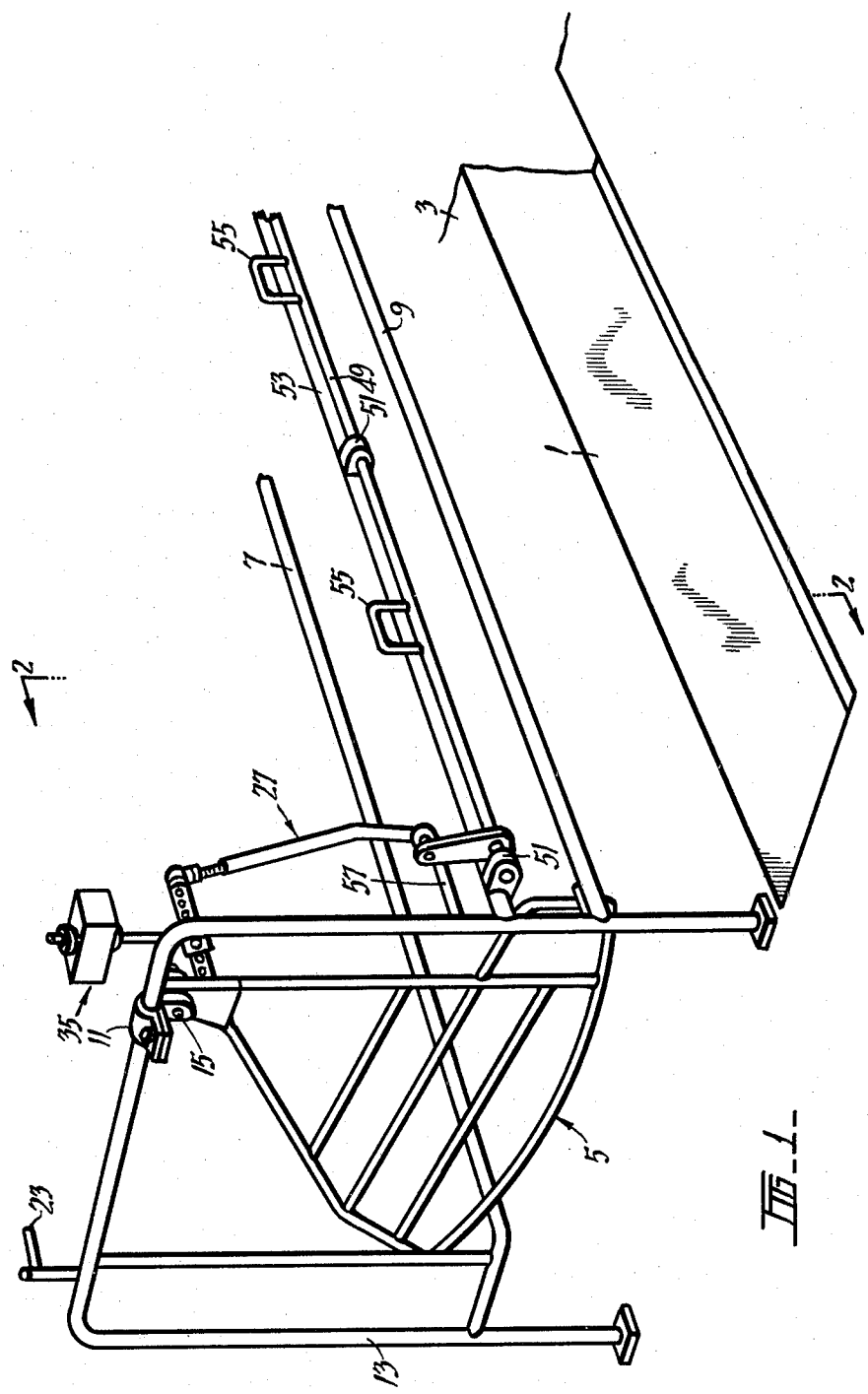
FIG. 1 is a perspective view of a part of a milking parlour including the gate of the present invention shown closed.

In the drawings the milking parlour has a pit 1 for workmen, and a stall 3 for the cattle to walk on. The stall is enclosed by a barrier 5 at each exit end (only one being shown), and an elongated breast rail 7 and rump rail 9 at the sides. The barrier 5 is pivotally supported by bracket member 11 attached to an inverted U-shaped support member 13. Typically the support member 13 is about 2 meters high and the pivot point 15 of barrier 5 is about 30 cm in from the pit.

The barrier 5 comprises a triangular or quasi-triangular framework with ribs 17 suitably arranged and spaced to prevent passage of an animal. A protruding or lateral extension 18 is located on the barriers at the bottom thereof on the side 21 adjacent the pit 1. This extension 18 is positioned at about the chest height of the cattle to be enclosed. To ensure positive locking of the barrier in its open and closed positions, and to limit movement thereof, stops 23 and 25 are welded to the support member 13.

Figure 3:
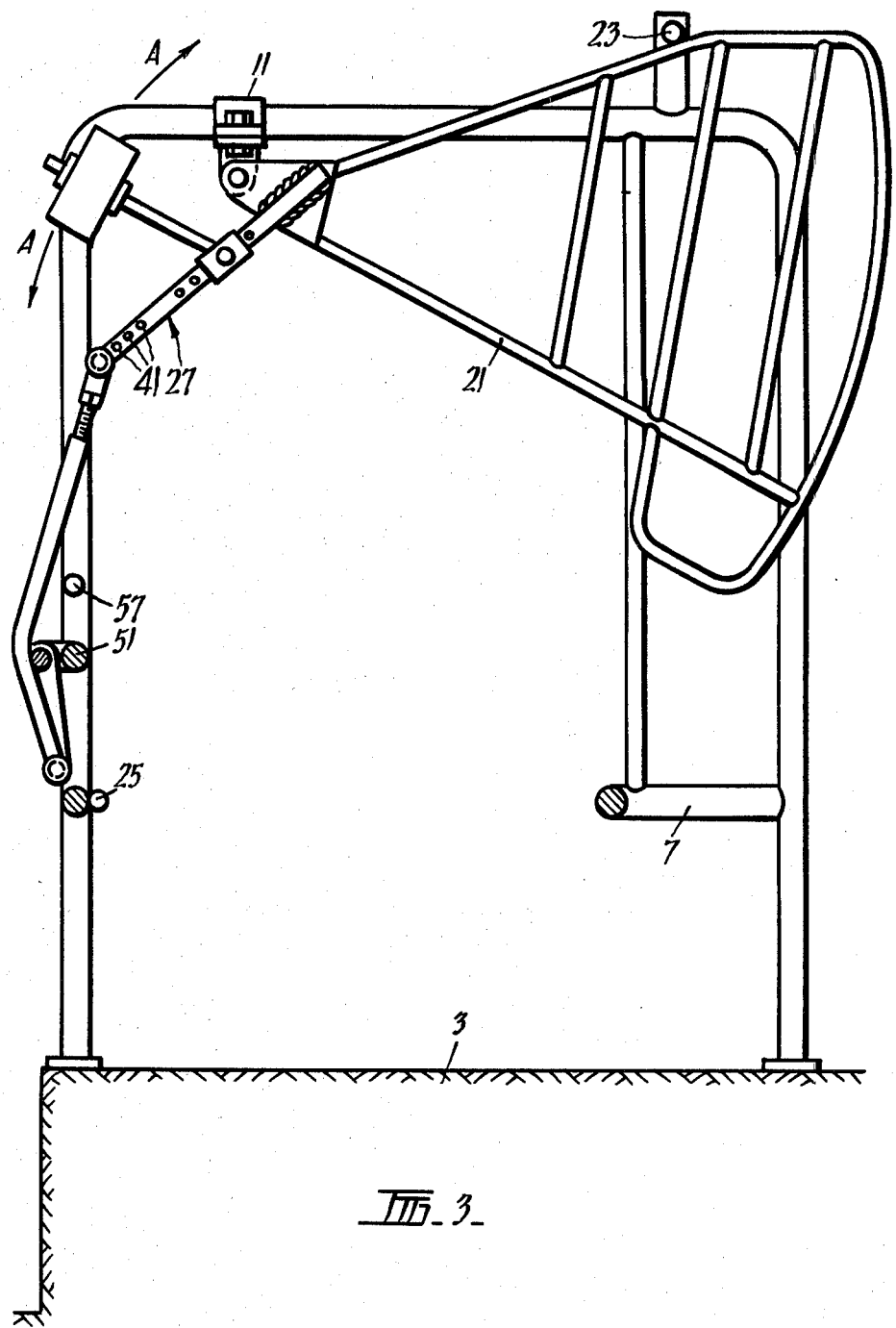
FIG. 3 is a similar view to that of FIG. 2 with the gate open.

To effect actuation of the barrier 5 a lever arrangement 27 is provided. An extension member 28 is welded to a plate 31 of barrier 5. A plurality of holes 33 allow positional adjustment of a counterweight 35. The counterweight may be additionally adjusted along threaded shaft 37 by nuts 39 and angularly adjusted as shown by arrows A, if desired. The extension member 28 is pivotally attached by adjustable pivot points 41 to a threadably adjustable spigot 43 of an angled arm 45. This arm is pivotally connected to a bell crank 47 to provide an over-centre locking action for the barrier 5 in its open position (FIG. 3).

Crank 47 is rotated by shaft 49 journalled in bearings 51 attached to rail 53 which extends longitudinally between the support members 13. to facilitate the operation of the barrier from any position along the stall 3, a plurality of handles 55 are welded to the shaft 49. To limit movement of the crank 47 in its closed position (FIG. 2) a stop 57 is provided.

Figure 2:
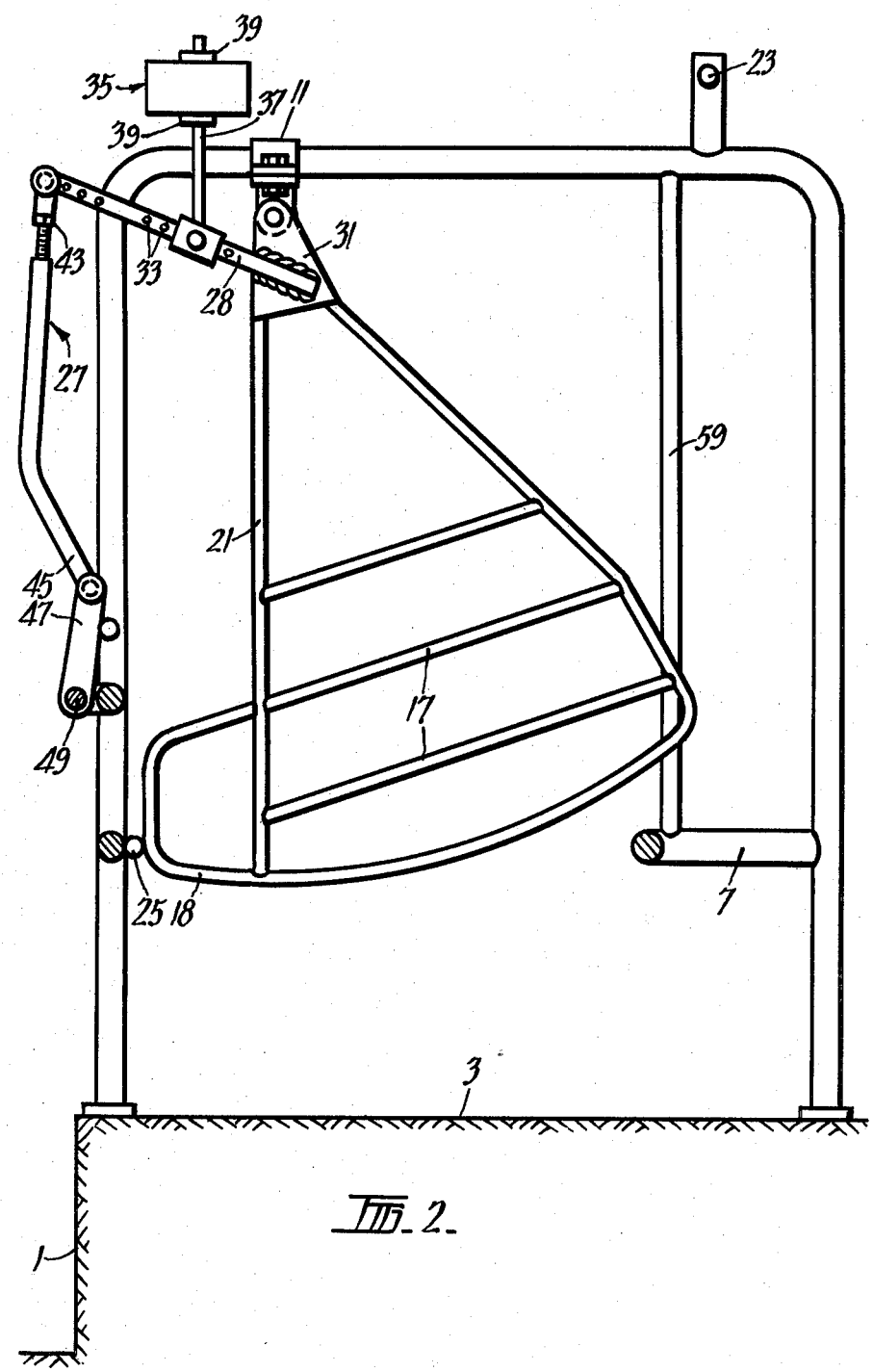
FIG. 2 is a cross-section along line 2—2 of FIG. 1.

In operation, the gate is initially shown closed as in FIG. 2. The barrier 5, together with rails 7 and 59, prevent exit of cattle. To open the gate, the handle 55 is turned, which moves angled arm 45 and extension member 28, to swing the barrier upwardly to allow the cattle to exit. The barrier is locked in its uppermost position (FIG. 3) by the combination of stop 23 and the over-centre action of angled arm 45. The gate is easily moved at all stages because of the use of counterweight 35. When closing of the gate is required the handle is rotated in the opposite direction to lower the barrier 5. The barrier is lowered onto the last cow to be released, with the protruding extension 18 riding along her side flank. In general, the lightness of the gate, being counterpoised as aforementioned, means that no substantial discomfort will be suffered by the last cow as a result of the action of the protruding extension, and the shape of the barrier is such that it cannot catch on the cow's hips.

As the rump of the cow passes through the gate the protruding extension will prevent the following cow from exiting. The cow will "back off" because of this extension, enabling the gate to swing shut under gravity (FIG. 2).

Figure 4:
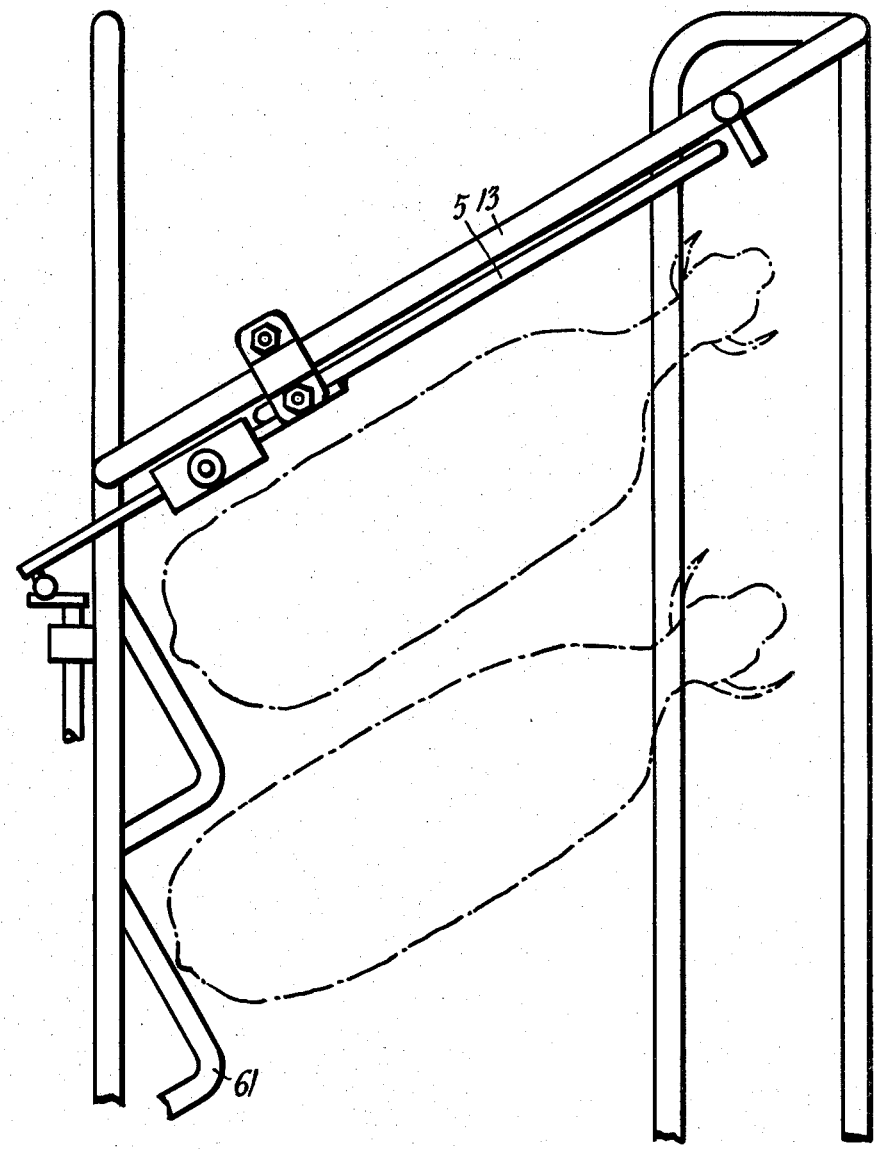
FIG. 4 is an elevation of a part of a milking parlour with a modified disposition of gate (shown closed) constraining the animals to adopt the aforesaid "herringbone" arrangement.

Although the gate has been illustrated in FIGS. 1 to 3 as being perpendicular to the longitudinal direction of the stall, the usual arrangement for a "herringbone" parlour is as shown in FIG. 4. The support member 13, and barrier 5, are oblique to the longitudinal direction of the stall. To further facilitate the positioning of the cattle within the stall a "saw-tooth" type rump rail 61 may be used. As the barrier is pivoted adjacent the pit side of the stall the gate has particular advantages when cows are exiting in a close herringbone style formation. In this formation the following cows head is to the far side of the exiting cow. The partial closure of the barrier by the exiting cow will prevent the following cow from "beating" the gate.

It is believed that the invention and many of its attendant advantages will be understood from the foregoing description and it will be apparent that various changes may be made in the form, construction and arrangement of the parts and that changes may be made in the form, construction and arrangement of the gate assembly described without departing from the spirit and scope of the invention or sacrificing all of its material advantages, the form hereinbefore described being merely a preferred embodiment thereof.

I claim:

1. A gate assembly for a milking parlor or like animal enclosure including,
   a barrier pivotally mounted about a substantially horizontal elevated axis from a support for movement between an open position in which it allows exit of an animal from the enclosure, and a closed position in which it prevents such exit,
   operating means for said barrier and a lever arrangement connecting said operating means to the barrier providing locking means tending to hold the barrier open against the action of gravity.
   said locking means providing a past dead centre locking action,
   said lever arrangement including an extension arm on said barrier,
   an angled arm pivotally attached to the extension arm,
   a bell crank arm pivotally connected to the angled arm and to a rotatable shaft attached to said support, and
   said operating means connected to said rotatable shaft for rotating the shaft and said crank arm for opening and closing said barrier.

2. An animal enclosure including, a longitudinal stall with a pit on at least one side thereof, a gate support member at either end of said stall with a gate as claimed in claim 1 pivotally attached thereto, and longitudinal rail members linking said gate support members.

3. The apparatus of claim 1 wherein said angled arm and said extension are adjustable in length, and said extension arm has a counterweight mounted thereon.

4. The apparatus of claim 1 wherein said barrier is triangular or quasi-triangular in shape and is pivotally mounted from the axis in a downward direction in the closed position.

5. A gate assembly for a milking parlour or like animal enclosure including,
   a barrier pivotally mounted about a substantially horizontal elevated axis from a support for movement between an open position which allows exit of an animal from the enclosure, and a closed position which prevents such exit,
   said barrier having a lateral extension from one side which is lower when the barrier is open,
   said extension being positioned when the barrier is in an intermediate position to ride over the side flank of an existing animal and when lowered prevents the exit of the following animal by being positioned at the chest height of the animal, and
   a lever arrangement connected to said barrier providing a past dead centre locking action for holding the barrier open against the action of gravity,
   said lever arrangement includes an extension arm on said barrier,
   a second arm pivotally attached to said extension arm,
   a bell crank arm pivotally connected to the second arm and to a rotatable shaft attached to said support, and
   handle means connected to said rotatable shaft for rotating the shaft and said crank arm for opening and closing said barrier.

* * * * *